A. F. McCONNELL.
Culinary Utensil.
No. 207,974.　　　　　Patented Sept. 10, 1878.
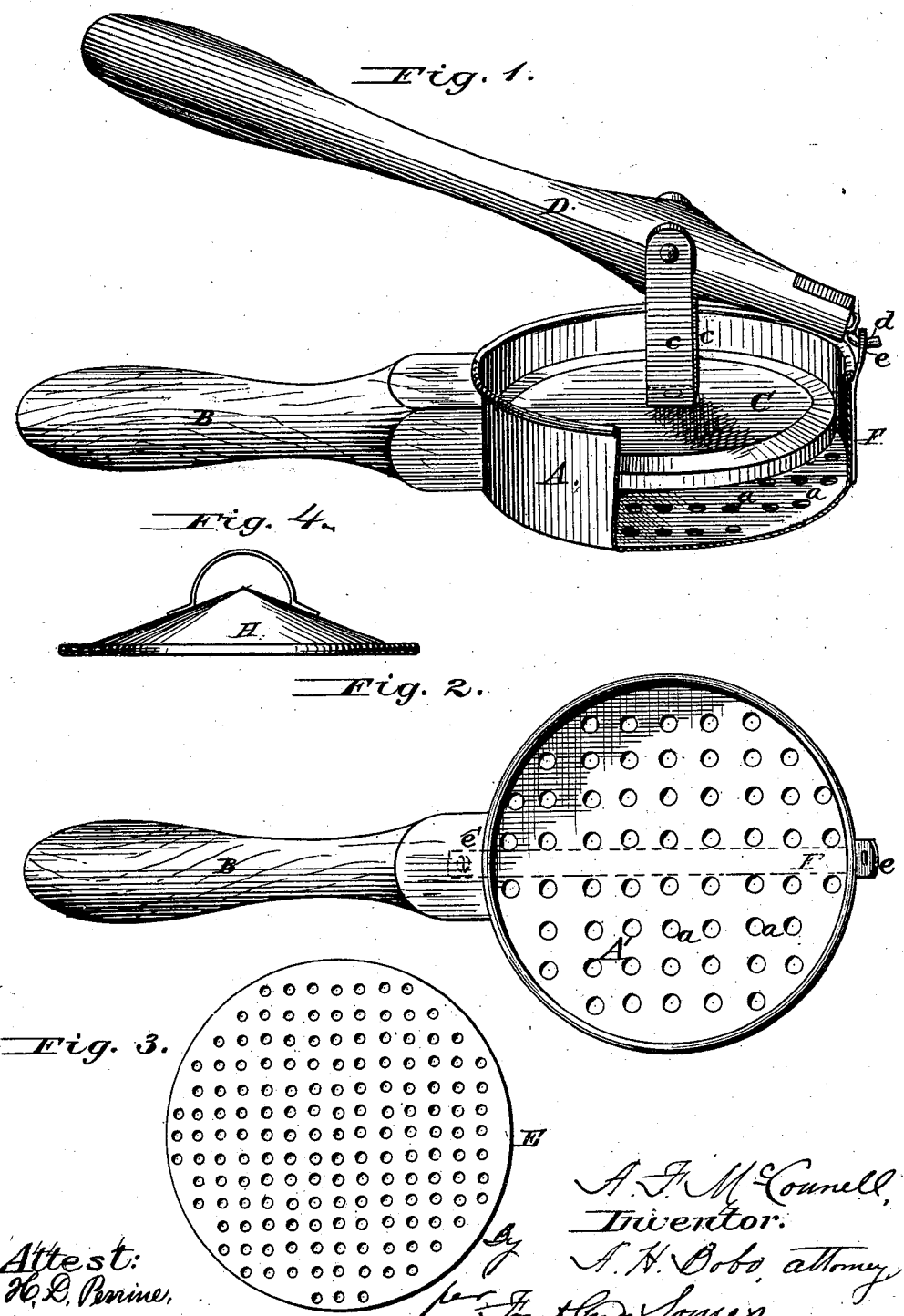

UNITED STATES PATENT OFFICE.

ATLASS F. McCONNELL, OF LEWISBURG, TENNESSEE.

IMPROVEMENT IN CULINARY UTENSILS.

Specification forming part of Letters Patent No. 207,974, dated September 10, 1878; application filed August 26, 1878.

*To all whom it may concern:*

Be it known that I, ATLASS F. MCCONNELL, of Lewisburg, in the county of Marshall and State of Tennessee, have invented certain new and useful Improvements in Culinary Utensils adapted for various purposes; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention consists in a domestic steamer provided with means whereby it is adapted for use as a vegetable and fruit masher and crusher, and as a strainer and presser for lard.

Figure 1 is a perspective view of the apparatus, showing one side broken away. Fig. 2 is a bottom view of the utensil. Fig. 3 represents a specimen of one of the loose removable diaphragms used in connection with the device. Fig. 4 is a tight-fitting cover.

A is the body of the utensil, cylindrical in form, constructed of sheet metal, and provided with the bottom A', having holes a. This portion of the structure is made of the usual form of the ordinary domestic steamer, being of a size adapted to fit over the top of a kettle, and the perforations in the bottom being comparatively coarse. Attached to the body A is a handle, B, preferably of wood, and projecting horizontally from the side. This handle is attached by means of screws passing from the interior through the side of the tin cylinder into the end of the handle; or it may be attached in any other suitable manner. A metallic or other strap, F, passes from the under side of the handle, to which it is attached at e', across the bottom of the structure, bends up the side, and projects above the rim of the structure, at a point opposite the handle, in the form of an ear, e. This ear has an eye, in which is fulcrumed the end of lever D. This lever extends across the top of the steamer and projects over the handle B. Attached to this lever is a plunger or follower, C, made to fit the interior of the cylinder A. The attachment is by means of the hinged support c, or otherwise. The outer end of the lever has a prong or hook, d, which hooks into the eye of the ear e. The follower is readily removed from the steamer by simply raising the handle end of the lever and drawing out the hooked end from the eye, and it is as readily replaced. The band or strap F unites the two compressing-levers B D, and bears the greater portion of the strain, serving at the same time to stiffen the bottom of the steamer. A loose diaphragm, E, with smaller perforations, is provided, made to fit loosely the interior of the cylinder, and designed to be dropped into the same, and to rest on the bottom thereof. Several of these perforated diaphragms of varying degrees of fineness may be provided, and the one best adapted to the article to be cooked or pressed will be made use of.

When it is desired to use the utensil simply as a domestic steamer, the follower is removed and the cylindrical structure is placed over a kettle, in the ordinary manner, and provided with a closely-fitting cover, H.

When it is desired to use the utensil as a vegetable or fruit crusher, the material to be crushed or pressed is placed in the cylinder, the follower C placed over the same, and the hooked end of the lever D inserted in the eye e. The two handles being then brought together, the material is compressed between the follower and the bottom A', or between the follower and one of the perforated diaphragms E resting on said bottom, as the case may be. In some cases the material itself will be forced through the perforations, while in others only the liquid squeezed therefrom will be allowed to escape, according to the purpose for which the utensil is being used.

When the utensil is to be used as a strainer or colander, the diaphragms E are made use of. Some of them may be made of wire-gauze for this purpose.

Vegetables and other articles requiring to be crushed or pressed after being cooked are first steamed in the vessel, and are then crushed, pressed, or strained without being removed therefrom. This is of especial advantage when it is necessary or desirable to keep the articles hot during the process of pressing or straining.

What is claimed as the invention is—

1. A steamer adapted to be used as a vegetable or fruit crusher, provided with means whereby the lever for applying power to the follower is readily adjusted thereto and removed therefrom, substantially as described.

2. A culinary utensil readily convertible from a steamer to a fruit and vegetable crusher, and vice versa, consisting of a cylindrical vessel having a perforated bottom made to fit over a kettle and an open top adapted to receive a closely-fitting cover, said vessel being provided with a removable plunger adapted to fit the interior thereof and to move vertically therein, and with a lever detachably fulcrumed to said vessel and connected to said plunger for operating the same, substantially as described.

3. A culinary utensil readily convertible from a steamer to a fruit and vegetable crusher, and vice versa, consisting of a cylindrical vessel having a perforated bottom made to fit over a kettle, and an open top adapted to receive a closely-fitting cover, said vessel being provided with a removable plunger adapted to fit the interior thereof and to move vertically therein, a lever detachably fulcrumed to said vessel and connected to said plunger, and a permanent handle operating in conjunction with said lever when the latter is adjusted to said vessel, substantially as described.

4. A culinary utensil readily convertible from a steamer to a fruit and vegetable crusher, and vice versa, consisting of a cylindrical vessel having a perforated bottom made to fit over a kettle and an open top adapted to receive a closely-fitting cover, said vessel being provided with a strengthening strap or band passing under the bottom to prevent injurious distension thereof when the utensil is used as a crusher or presser, substantially as described.

5. A culinary utensil readily convertible from a steamer to a fruit and vegetable crusher, and vice versa, consisting of a cylindrical vessel having a perforated bottom made to fit over a kettle, and an open top adapted to receive a closely-fitting cover, said vessel being provided with a removable plunger adapted to fit the interior thereof and to move vertically therein, a lever detachably fulcrumed to said vessel and connected to said plunger, a permanent handle operating in conjunction with said lever when the latter is adjusted to said vessel, and a strengthening strap or band passing under the perforated bottom, having one end attached to said handle and the other end provided with an eye to receive the fulcrum end of said lever, substantially as described.

6. A culinary utensil introconvertible into a steamer, fruit and vegetable crusher, lard-presser, or colander, consisting of a cylindrical vessel having a perforated bottom made to fit over a kettle and an open top adapted to receive a closely-fitting cover, said vessel being provided with one or more loose removable diaphragms adapted to fit the interior, and of finer perforations than the said perforated bottom, combined with the removable plunger and detachable lever, substantially as described.

In testimony that I claim the foregoing as my own I affix my signature in presence of two witnesses.

ATLASS F. McCONNELL.

Witnesses:
H. D. McATEER,
M. L. BRECHEEN.